US009749955B2

(12) United States Patent
Min et al.

(10) Patent No.: US 9,749,955 B2
(45) Date of Patent: Aug. 29, 2017

(54) CONNECTIVITY MANAGEMENT FOR MOBILE WIRELESS LOW-POWER WAKE-UP RADIOS

(71) Applicant: INTEL CORPORATION, Santa Clara, CA (US)

(72) Inventors: Alexander W. Min, Portland, OR (US); Minyoung Park, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 61 days.

(21) Appl. No.: 14/803,914

(22) Filed: Jul. 20, 2015

(65) Prior Publication Data
US 2017/0026907 A1 Jan. 26, 2017

(51) Int. Cl.
*G08C 17/00* (2006.01)
*H04W 52/02* (2009.01)
*H04W 4/00* (2009.01)
*H04W 84/12* (2009.01)
*H04W 84/18* (2009.01)

(52) U.S. Cl.
CPC ....... *H04W 52/0229* (2013.01); *H04W 4/008* (2013.01); *H04W 52/0216* (2013.01); *H04W 52/0254* (2013.01); *H04W 84/12* (2013.01); *H04W 84/18* (2013.01); *Y02B 60/50* (2013.01)

(58) Field of Classification Search
None
See application file for complete search history.

(56) References Cited

U.S. PATENT DOCUMENTS

| 2009/0168670 A1* | 7/2009 | Yang ...................... H04L 67/12 370/254 |
| 2010/0279745 A1* | 11/2010 | Westcott et al. ... H04W 52/0274 455/574 |
| 2012/0190390 A1* | 7/2012 | Reunamaki et al. ...................... H04W 52/0229 455/500 |

OTHER PUBLICATIONS

Raghavendra, Ramya et al. "Unwanted Link Layer Traffic in Large IEEE 802.11 Wireless Networks" IEEE Transactions on Mobile Computing, vol. 9, No. 9, Sep. 2010.

* cited by examiner

*Primary Examiner* — Minh-Trang Nguyen
(74) *Attorney, Agent, or Firm* — Jason H. Vick; Sheridan Ross, PC

(57) ABSTRACT

Mobile platform power management is an important problem especially for battery-powered small form factor platforms such as smartphones, tablets, wearable devices, Internet of Things (IOT) devices, and the like. A low-power wake-up radio cooperates with a mobility manager which is configured to receive information from one or more sensors and determine a mobility management frame. The mobility management frame specifies transmitter operation, such as a number and time interval over which to transmit a number of wake-up packets, which are usable by the low-power wake-up radio to control main radio operation in the wireless communications device.

22 Claims, 9 Drawing Sheets exemplary aspect is directed toward communications systems. More specifically an exemplary aspect is directed toward wireless communications systems and even more specifically to power management in wireless communications systems.

BACKGROUND

Wireless networks are ubiquitous and are commonplace indoors and becoming more frequently installed outdoors and in shared locations. Wireless networks transmit and receive information utilizing varying techniques. For example, but not by way of limitation, two common and widely adopted techniques used for communication are those that adhere to the Institute for Electronic and Electrical Engineers (IEEE) 802.11 standards such as the IEEE 802.11n standard and the IEEE 802.11 ac standard.

The IEEE 802.11 standards specify a common Medium Access Control (MAC) Layer which provides a variety of functions that support the operation of IEEE 802.11-based wireless LANs (WLANs). The MAC Layer manages and maintains communications between IEEE 802.11 stations (such as between radio network interface cards (NIC) in a PC or other wireless device(s) or stations (STA) and access points (APs)) by coordinating access to a shared radio channel and utilizing protocols that enhance communications over a wireless medium.

IEEE 802.11 ax is the successor to 802.11 ac and is proposed to increase the efficiency of WLAN networks, especially in high density areas like public hotspots and other dense traffic areas. IEEE 802.11ax will also use orthogonal frequency-division multiple access (OFDMA). Related to IEEE 802.11 ax, the High Efficiency WLAN Study Group (HEW SG) within the IEEE 802.11 working group is considering improvements to spectrum efficiency to enhance system throughput/area in high density scenarios of APs (Access Points) and/or STAs (Stations).

Bluetooth® is a wireless technology standard adapted to exchange data over short distances using short-wavelength UHF radio waves in the ISM band from 2.4 to 2.485 GHz. Bluetooth® is commonly used to communicate information from fixed and mobile devices and for building personal area networks (PANs).

Bluetooth® Low Energy (BLE), also known as Bluetooth® Smart®, utilizes less power than Bluetooth® but is able to communicate over the same range as Bluetooth®.

Wi-Fi (IEEE 802.11) and Bluetooth® are somewhat complementary in their applications and usage. Wi-Fi is usually access point-centered, with an asymmetrical client-server connection with all traffic routed through the access point (AP), while Bluetooth® is typically symmetrical, between two Bluetooth® devices. Bluetooth® works well in simple situations where two devices connect with minimal configuration like the press of a button, as seen with remote controls, and the like. Wi-Fi tends to operate better in applications where some degree of client configuration is possible and higher speeds are required, especially for network access through, for example, an access node. However, Bluetooth® access points do exist and ad-hoc connections are possible with Wi-Fi though not as simply configured as Bluetooth®.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DESCRIPTION OF EMBODIMENTS

Mobile platform power management is critical for battery-powered small form factor platforms such as smartphones, tablets, wearable and IoT devices. Most mobile platform workloads are communication driven and the wireless radio is often one of the main sources of the platform's power consumption.

Also, small computing devices such as wearable devices and sensors, mobile devices, Internet of Things (IoT) devices, and the like, are constrained by their small battery capacity/size but still need to support wireless communication technologies such as Wi-Fi, Bluetooth®, Bluetooth® Low Energy (BLE), or the like, or in general any wireless technology, to connect to other computing devices, such as smartphones, tablets, computers, and the like, and exchange data. These communications consume power and it is critical to minimize energy consumption for such communications in these devices.

One ideal strategy to minimize energy consumption is to turn the power off to the communication block as much/often as possible while maintaining data transmission and reception without a corresponding increase in latency. That is, power on the communications block only when there is data to transmit and wake-up the communications block just before data reception, and power off the communications block for the remainder of the time.

Figure 1:
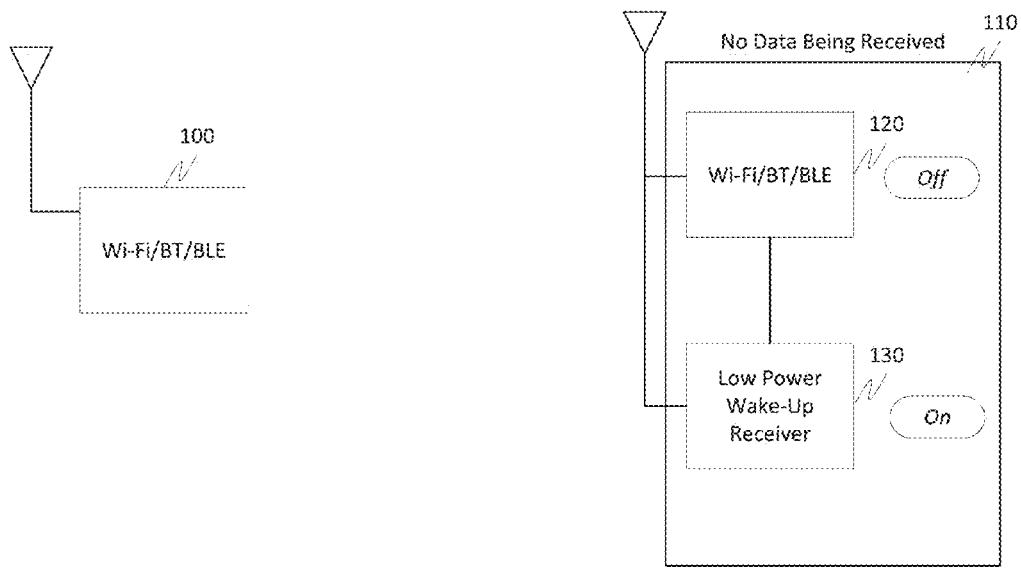
FIG. 1 illustrates a Low-Power Wake-Up Radio (LP-WUR) in a no data being received environment and the corresponding states of the Low-Power Wake-Up receiver and main radio.

To address this issue, a radio architecture in which a specially designed low-power (e.g., with ~50 μW active power) wake-up radio (LP-WUR) is used along with a main wireless radio (e.g., Wi-Fi, BT and/or BLE). Here the main radio wakes up only when the main radio has data to send to or receive from another radio (e.g., a Wi-Fi AP), as shown in FIG. 1. For example, when the Wi-Fi device (e.g., smartphone) has data to send to the mobile platform, the Wi-Fi device will send a wake-up signal, which in turn wakes up the main radio.

Figure 2:
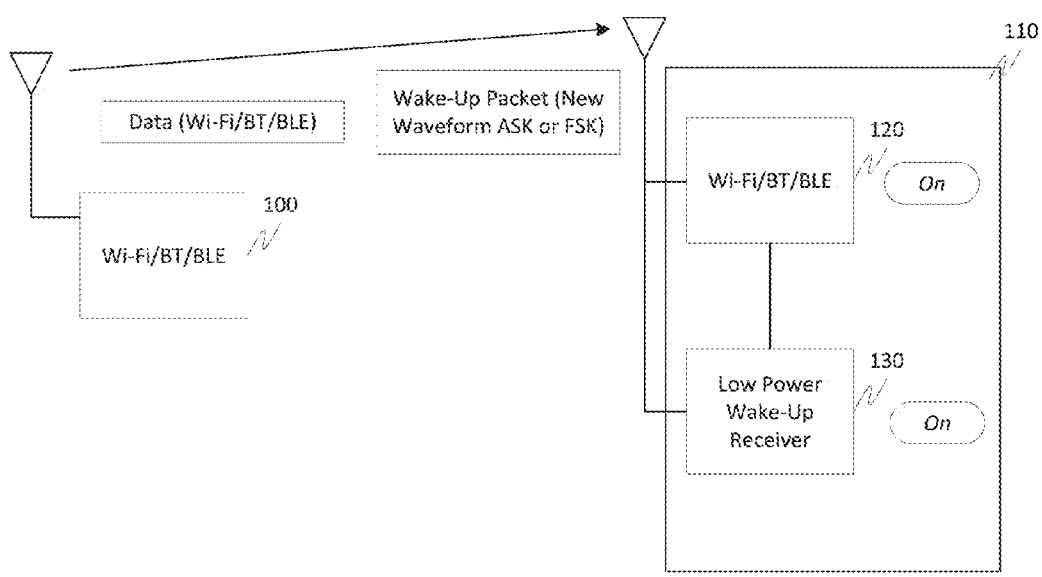
FIG. 2 illustrates a Low-Power Wake-Up Radio (LP-WUR) that is receiving data and the corresponding states of the Low-Power Wake-Up receiver and main radio.

As illustrated in FIGS. 1 and 2, one way to realize this operational transmit/receive strategy is to have a low-power wake-up receiver/radio (LP-WUR) that can wake-up the main radio, such as a Wi-Fi, Bluetooth® radio, BLE radio, only when there is data to receive/transmit. (See FIG. 1 where the Wi-Fi/BT/BLE radio 120 is off and the low power wake-up receiver 130 is on with no data being received from device 100). Some research shows the power consumption of such low-power wake-up radios (LP-WUR) can be less than 50 microwatts as discussed above.

However, in FIG. 2, when a wake-up packet is received from the AP 100, the LP-WUR 130 wakes-up the Wi-Fi/BT/BLE radio 120, so that a data packet that follows the wake-up packet from the AP can be received correctly. In some cases however, the actual data or an IEEE 802.11 MAC frame can be included in a wake-up packet. In this case, there is no need to wake-up the whole Wi-Fi/BT/BLE radio, but just a portion of the Wi-Fi/BT/BLE radio needs to be woken up to do the necessary processing. This can lead to significant power savings.

One exemplary technique disclosed herein recognizes that a LP-WUR can significantly reduce radio and platform power consumption. By allowing the main radio to stay in a low-power sleep (or "turned off") state for longer periods of time without increasing latency to receive data, in a mobile environment, when the LP-WUR receiver moves outside of the transmitter's transmission range with the main radio being turned off, the LP-WUR receiver may not receive wake-up packets from the transmitter (e.g., an AP). This may cause excessive packet delay or packet loss because the receiver does not know whether the receiver has moved out of transmission range, and the receiver may think that there is no packet to receive from the AP.

Figure 6:
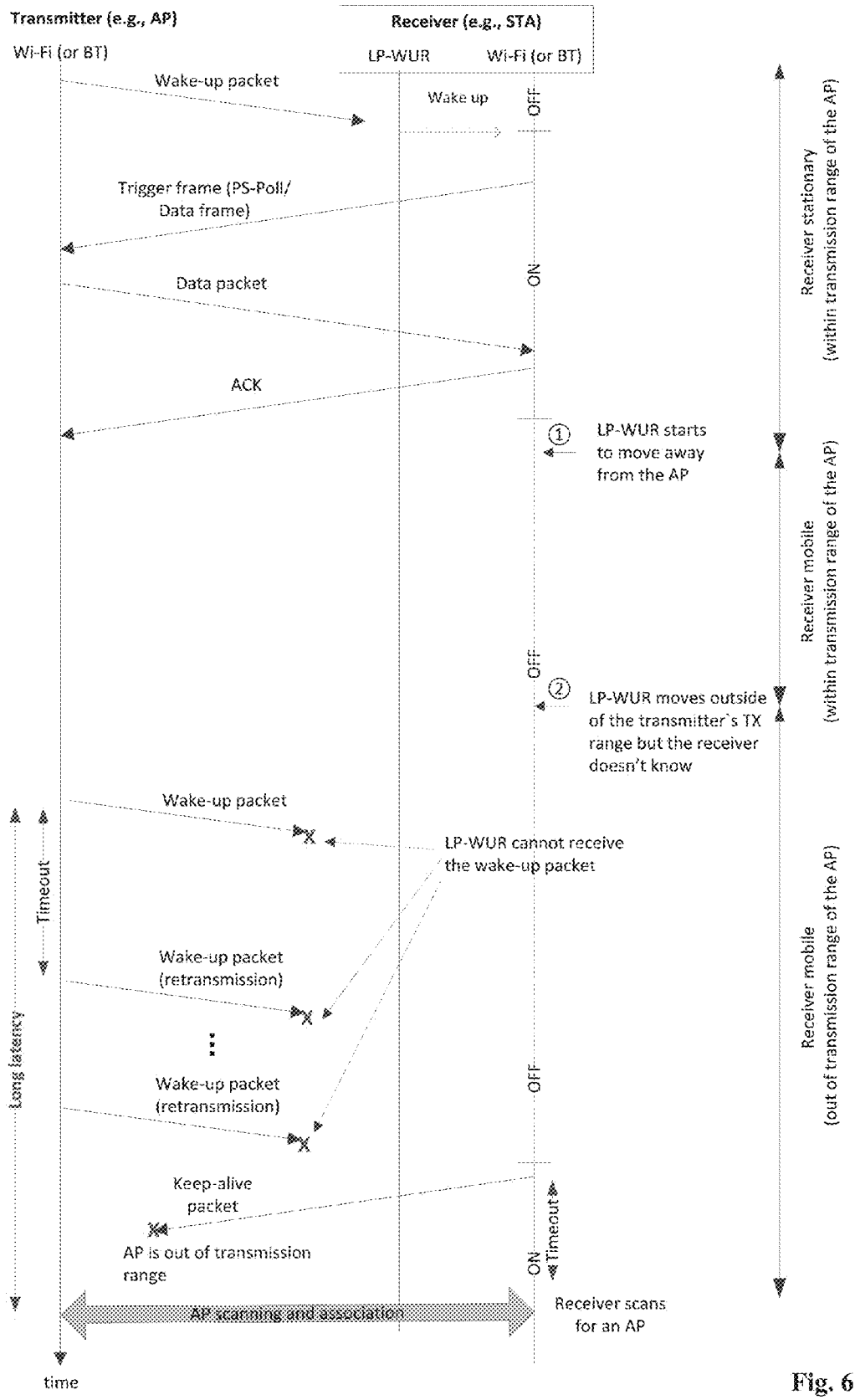
FIG. 6 is a fence-post diagram illustrating one exemplary operational problem of a LP-WUR.

This problem is illustrated in FIG. 6 where long latencies are experienced (as well as power wasted).

In FIG. 6, a wake-up packet is received at the receiver LP-WUR and a wake-up signal is sent to the Wi-Fi/BT/BLE radio, which turns on.

The Wi-Fi/BT/BLE radio then returns a trigger frame to the transmitter. The transmitter then forwards a data packet back to the Wi-Fi/BT/BLE radio which can return an ACK. Up until this point, the receiver has been stationary, and within the transmission range of the AP. However, at point 1, the device with the LP-WUR radio starts to move away from the AP. Then, at point 2, the LP-WUR moves outside of the transmitter's transmission range, but the receiver is unaware of this. Therefore, from point 1 to point 2, the receiver is mobile, but still within the transmission range of the AP. After point 2, the receiver is mobile, and outside of the transmission range of the AP and, as illustrated in FIG. 6, any wake-up packets sent from the transmitter (i.e., the AP) to the receiver (i.e., the mobile device) will not be received. When the receiver then sends the keep-alive packet (or normal packet data) to the AP, which is out of transmission range, this causes long latency, time outs, and the necessity of performing an AP scan and (re)association at a significant time after the first wake-up packet was sent from the AP.

On the other hand, if the main radio wakes-up frequently and checks the connectivity/AP-association status (e.g., by transmitting a keep-alive packet to the AP or receiving a beacon from the AP), the power saving benefits afforded by the LP-WUR can be disrupted and the STA (Station/mobile/wireless device) will lose power saving opportunities.

Therefore, the connectivity management between an AP and LP-WUR-equipped STA(s) should be designed carefully in order to fully benefit from the power saving benefits that are offered by the LP-WUR at least without sacrificing latency performance.

One exemplary embodiment improves the AP-STA connectivity management for LP-WUR equipped STAs and achieves better latency performance in mobile environments without causing unnecessary power consumption and/or increased bandwidth overhead for connectivity management.

Another exemplary embodiment recognizes that mobile platform power management is an important problem especially for battery-powered small form factor platforms such as smartphones, tablets, wearable devices, Internet of Things (IOT) devices, and the like. To address this need, a low-power wake-up radio cooperates with a mobility manager which is configured to receive information from one or more sensors and determine a mobility management frame. The mobility management frame specifies transmitter operation, such as a number and time interval over which to transmit a number of wake-up packets, which are usable (based, for example, on whether or not they are received) by the low-power wake-up radio to control main radio operation in the wireless communications device.

Figure 3:
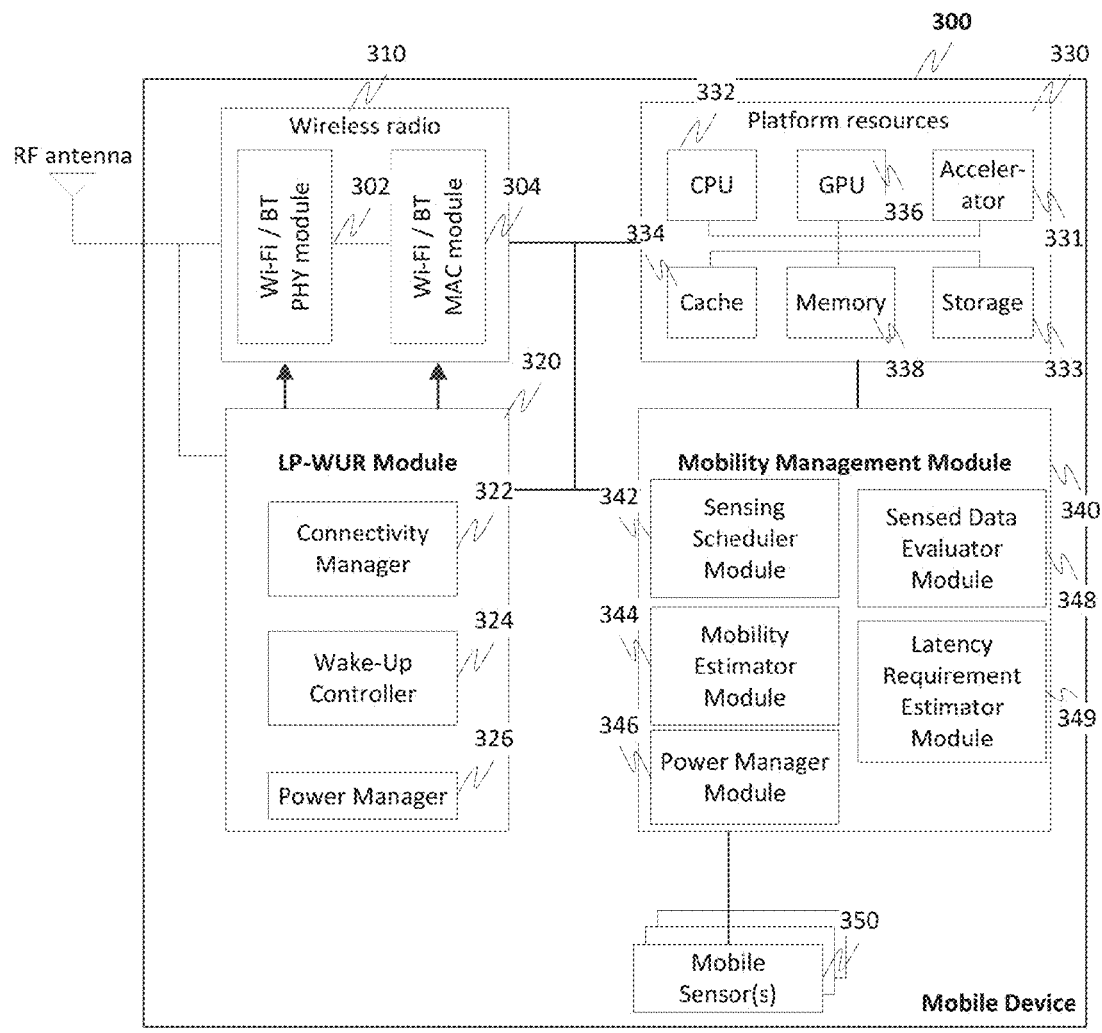
FIG. 3 illustrates a functional block diagram of a wireless device, such as a mobile device.

FIG. 3 illustrates an exemplary functional block diagram of a wireless device 300, such as a mobile device, that can be used with any one or more of the aspects disclosed herein. In particular, this exemplary architecture, where well-known components have been omitted for clarity, allows the LP-WUR module 320 to improve connectivity management for the device 300 and optionally various platform resources 330.

More specifically, FIG. 3 illustrates an exemplary wireless/mobile device 300 that includes a wireless radio 310, which includes a Wi-Fi/Bluetooth® (BT)/BLE PHY module 302, a Wi-Fi/BT/BLE MAC module 304, an LP-WUR module 320, and one or more platform resources 330, such as CPU 332, cache 334, GPU 336, memory 338, accelerator 331 and storage 333.

In addition, the wireless/mobile device 300 includes a connectivity manager 322, a wake-up controller 324 and a power manager 326. The wireless/mobile device 300 also includes a mobility management module 340 which includes a sensing scheduler module 342, a mobility estimator module 344, a power manager module 346, a sensing data evaluator module 348 and a latency requirement estimator module 349. The mobile device 300 can also include one or more sensors 350 such as an accelerometer, gyroscope, GPS, Wi-Fi location determination module, and in general any device(s) capable of determining a position or change in position.

In accordance with one exemplary embodiment, the presence of the LP-WUR is leveraged to one or more of improve latency and reduce power consumption. More specifically, the LP-WUR module 320 maintains connectivity to the AP without waking up the main radio 310. The AP transmits wake-up packets with partial beacon information to the associated stations equipped with LP-WURs. When the wake-up packets are periodically received, the station "knows" that the AP is still within transmission range. Otherwise, if the periodic wake-up packets are not received, the station "knows" or detects that the AP is outside of the transmission range with this information being communicable to the main wireless radio 310 by the wake-up controller 324 and connectivity manager 322. This allows the main radio 310 to stay in a sleep state, or turned off, for a longer period of time and maximize the radio/platform power saving without risking disconnection from the AP for a longer period of time.

Moreover, the presence of mobile sensors 350 can be capitalized upon to assist with detecting and evaluating whether the mobile device 300 is mobile. More specifically, information from one or more of the mobile sensors 350 can be used by the sensed data evaluator module 348 to determine such things as whether the device 300 is moving, how fast the device is moving, the direction the device is moving, and in general any metric usable to quantify whether one or more of: the device 300 is moving, the device is stationary, the device is within transmission range of the AP, and a location of the device relative to the AP.

Then, in conjunction with the mobility estimator module 344, and a sensing scheduler module 342, the system can determine, for example, how frequently/how many keep-alive or wake-up packets should be communicated and/or exchanged with another device, such as an AP. In conjunction with the power management module 346, which cooperates with the various elements in the LP-WUR module 320, power is controlled within the LP-WUR 320 and/or the wireless radio 310. More specifically, the mobile device 300 is able to exploit the information gathered by one or more of the mobile sensors 350, such as an accelerometer, gyroscope, GPS module, Wi-Fi position detection sensor, or the like, to detect the LP-WUR receiver's mobility status, such as stationary, mobile, travel distance, traveling direction, speed, and the like, and adapt its wake-up packet transmission behavior according to any one or more of these metrics. As discussed, this can be performed in conjunction with various elements within the mobility management module 340 and the LP-WUR module 320. When a station with a LP-WUR is moving, the station can ask an access point (AP) or other device to periodically transmit wake-up signals with (partial) beacon information. When a station is stationary, the station can ask the AP to stop the wake-up packet transmission as will be illustrated hereinafter.

One exemplary simple solution is to rely on existing connectivity management mechanisms of the main radio (e.g., IEEE 802.11). For example, a STA (station) can periodically wake-up from sleep and transmit a keep-alive message to the AP. However, this is not desirable in that: (i) the behavior will limit the potential power saving gain from the LP-WUR due to the need for frequent wake-up(s) of the main radio for sending keep-alive packets, or receiving beacons periodically to maintain connectively, and (ii) such management frames can introduce unnecessary management traffic to the network, e.g., overhead.

One exemplary aspect discussed herein leverages the presence of the LP-WUR at the receiver and the presence of mobile sensors in the mobile platform to maintain AP-to-STA connectivity/association in a mobile environment without needing to frequently wake-up the main radio. While the exemplary embodiments discussed herein will be described in relation to AP-to-STA connectivity/association (or vise versa), it should be appreciated that these techniques can be extended to other connectivity's/associations, such as Bluetooth®, BLE, and in general any wireless protocol(s) or standard.

For example, one or more of the mobility estimator module 344, sensed data evaluator module 348 and latency requirement estimator module 349 can be utilized to determine, for example, whether the device 300 is mobile or stationary, and if mobile, information about the mobility such as how fast the device is moving. This information can then be used to determine the mobility status of the device 300, which in turn is then usable, optionally in conjunction with the latency requirement estimator module 349, to determine how frequently/how long signaling should be updated to keep one or more of the LP-WUR and wireless radio 310 awake. These components can similarly be used, when the station is stationary, to determine how infrequently wake-up or keep-alive messages need to be exchanged.

Figure 4:
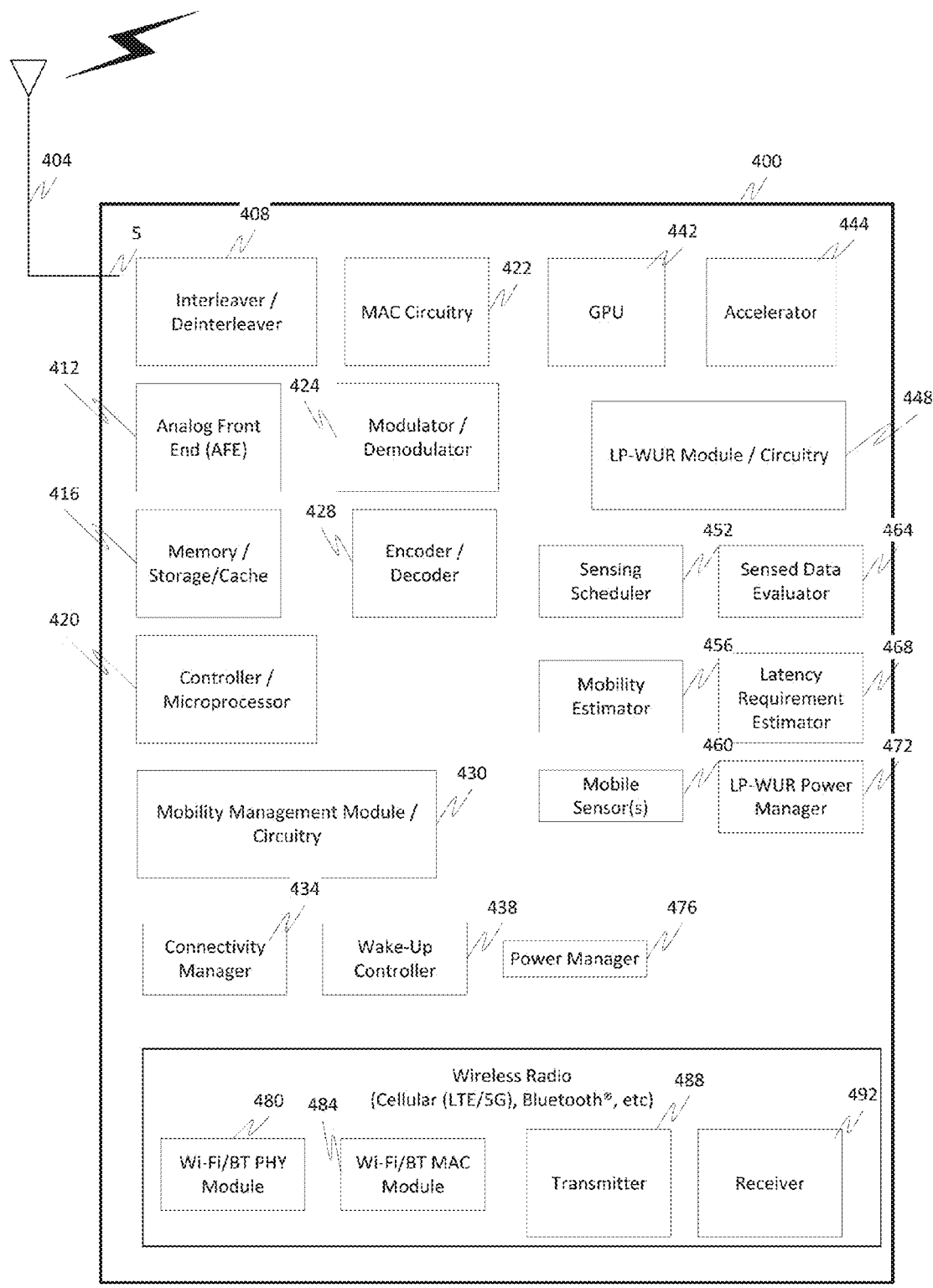
FIG. 4 illustrates a hardware block diagram of an exemplary wireless device, such as a mobile device.

FIG. 4 illustrates an exemplary hardware diagram of a device 400, such as a wireless device, mobile device, access point, or the like, that is adapted to implement the technique(s) discussed herein.

In addition to well-known componentry (which has been omitted for clarity), the device 400 includes one or more antennas 404, an interleaver/deinterleaver 408, an analog front end (AFE) 412, memory/storage/cache 416, controller/microprocessor 420, MAC circuitry 422, modulator/demodulator 424, encoder/decoder 428, GPU 442, accelerator 444, an LP-WUR module and/or circuitry 448, mobility management module and/or circuitry 430, connectivity manager 434, wake-up controller 438, power manager 476, sensing scheduler 452, mobility estimator 456, mobile sensor(s) 460, sensed data evaluator 464, latency requirement estimator 468, LP-WUR power manager, and wireless radio components such as a Wi-Fi PHY module 480, a Wi-Fi/BT MAC module 484, transmitter 488 and receiver 492. The various elements in the device 400 are connected by one or more links (not shown, again for sake of clarity).

The device 400 can have one more antennas 404, for use in wireless communications such as multi-input multi-output (MIMO) communications, Bluetooth®, etc. The antennas 404 can include, but are not limited to directional antennas, omnidirectional antennas, monopoles, patch antennas, loop antennas, microstrip antennas, dipoles, and any other antenna(s) suitable for communication transmission/reception. In an exemplary embodiment, transmission/reception using MIMO may require particular antenna spacing. In another exemplary embodiment, MIMO transmission/reception can enable spatial diversity allowing for different channel characteristics at each of the antennas. In yet another embodiment, MIMO transmission/reception can be used to distribute resources to multiple users.

Antenna(s) 404 generally interacts with an Analog Front End (AFE) 412, which is needed to enable the correct processing of the received modulated signal and signal conditioning for a transmitted signal. The AFE 412 can be functionally located between the antenna and a digital baseband system in order to convert the analog signal into a digital signal for processing and vice-versa.

The device 400 can also include a controller/microprocessor 420 and a memory/storage/cache 416. The device 400 can interact with the memory/storage/cache 416 which may store information and operations necessary for configuring and transmitting or receiving the information described herein. The memory/storage/cache 416 may also be used in connection with the execution of application programming or instructions by the controller/microprocessor 420, and for temporary or long term storage of program instructions and/or data. As examples, the memory/storage/cache 420 may comprise a computer-readable device, RAM, ROM, DRAM, SDRAM, and/or other storage device(s) and media.

The controller/microprocessor 420 may comprise a general purpose programmable processor or controller for executing application programming or instructions related to the device 400. Furthermore, the controller/microprocessor 420 can perform operations for configuring and transmitting information as described herein. The controller/microprocessor 420 may include multiple processor cores, and/or implement multiple virtual processors. Optionally, the controller/microprocessor 420 may include multiple physical processors. By way of example, the controller/microprocessor 420 may comprise a specially configured Application Specific Integrated Circuit (ASIC) or other integrated circuit, a digital signal processor, a controller, a hardwired electronic or logic circuit, a programmable logic device or gate array, a special purpose computer, or the like.

The device 400 can further include a transmitter 488 and receiver 492 which can transmit and receive signals, respectively, to and from other wireless devices or access points using the one or more antennas 404. Included in the device 400 circuitry is the medium access control or MAC Circuitry 422. MAC circuitry 422 provides for controlling access to the wireless medium. In an exemplary embodiment, the MAC circuitry 422 may be arranged to contend for the wireless medium and configure frames or packets for communicating over the wireless medium.

The device 400 can also optionally contain a security module (not shown). This security module can contain information regarding but not limited to, security parameters required to connect the device to an access point or other device or other available network(s), and can include WEP or WPA/WPA-2 (optionally+AES and/or TKIP) security access keys, network keys, etc. The WEP security access key is a security password used by Wi-Fi networks. Knowledge of this code will enable a wireless device to exchange information with the access point. The information exchange can occur through encoded messages with the WEP access code often being chosen by the network administrator. WPA is an added security standard that is also used in conjunction with network connectivity with stronger encryption than WEP.

As shown in FIG. 4, the exemplary device 400 also includes a GPU 442, an accelerator 444, a LP-WUR module and/or circuitry 448 a Wi-Fi/BT/BLE PHY module 480 and a Wi-Fi/BT/BLE MAC module 484 that at least cooperate with the LP-WUR module 448 and one or more of the sensing scheduler 452, sensed data evaluator 464, mobility estimator 456, latency requirement estimator 468, mobile sensor(s) 460, LP-WUR power manager 472, connectivity manager 434, wake-up controller 438 and power manager 476 to achieve at least the more efficient operation as discussed herein.

In accordance with an exemplary operational embodiment, the following types of behaviors for the LP-WUR transmitter and/or receiver are managed by the connectivity manager 434. More specifically, and in the receiver, optionally in cooperation with one or more of the components of the platform, e.g., GPU 442, accelerator 444, etc., the sensed data evaluator 464 and LP-WUR power manger 472 monitor the mobility status based on information from one or more of the mobile sensors 460 (e.g., always-on always-sensing) and/or one or more of the mobile sensors 460 embedded in the platform, such as an accelerometer, gyroscope, digital compass, and the like.

Upon detection of a mobility status change between, for example, a stationary status and a mobile states, or a status change within a mobile state (e.g., a speed or direction change, or the like), the LP-WUR power manger 472 wakes up the main radio, if it is in a sleep state or an off state, and sends mobility status information, such as stationary, mobile, etc., to the main radio since the main radio is capable of being directly interrupted and woken up by the LP-WUR power manger 472 and/or the LP-WUR module 448. This mobility status information or message can contain more detailed information about the device such as moving speed, accelerometer, direction, or the like.

In the main radio, and upon the reception of the mobility status change information or message from one or more of the platform, sensor(s), and the various components discussed above, the main radio, at the direction of the power manager 476, performs the following:

If the mobility status changes from stationary to mobile—then the main radio sends a mobility management frame (mobility status frame) to, for example, an AP indicating the status change, forwards a mobility status change update to the LP-WUR receiver 448, and enters the sleep or off state.

If the mobility status changes from mobile to stationary—then the main radio sends a mobility management frame, with the cooperation of the mobility management module/circuitry 430, to the AP indicating the status change, forwards a mobility status change update to the LP-WUR receiver 448, and enters the sleep/off state.

If the mobility status change is within mobile state, such as from slow to fast, change of direction, or the like, then the main radio can send a mobility management frame, with the cooperation of the mobility management module 430, to the AP indicating the status change, forward a mobility status change update to the LP-WUR receiver 448 and enter the sleep or off state.

In the transmitter (such as in an AP), and upon reception of the mobility management information/message from the receiver, the transmitter performs the following:

If the mobility status changes from stationary to mobile—then the transmitter schedules a periodic wake-up packet transmission with 802.11 beacon information.

If the mobility status changes from mobile to stationary—then the transmitter stops scheduling the wake-up packet transmission that uses partial 802.11 beacon information.

If the mobility status changes within the mobile state, such as direction, speed, velocity, or the like, then the transmitter re-schedules periodic wake-up packet transmission, such as by adjusting the wake-up transmission period using IEEE 802.11 beacon information.

In the LP-WUR receiver 448, and in the mobile state, the LP-WUR receiver 448 performs the following:

Waits for a wake-up packet from, for example, an AP with the IEEE 802.11 beacon information. If the LP-WUR 448 does not receive M consecutive wake-up packets with beacon information from the AP within a pre-defined time interval, the LP-WUR 448 wakes-up the main radio and indicates that the link between the AP and the receiver has been lost. At this point, the main radio may initiate an AP scanning procedure.

It should be noted that the monitoring parameters such as "M" and "pre-defined time interval", can be calculated by the station (and/or AP), such as by the sensing scheduler 452, which can dynamically adjusted one or more of the values based on one or more parameters such, for example, mobility status, latency performance requirements, sleep state, or the like. For example, if the receiver is in a deep sleep, the monitoring parameters can optionally be more frequent than, for example, other sleep states.

In the stationary state, the LP-WUR 448 does not need to wait for a periodic wake-up packet with beacon information since the link should not change. In other words, the lack of wake-up packets from the AP does not indicate that the receiver is out of the AP's transmission range. However, the LP-WUR 448 can wait for a wake-up packet from the AP, and upon the reception of a wake-up packet, the LP-WUR 448 can wake up the main radio. The LP-WUR can also monitor the mobility status changes (e.g., from stationary to mobile), and take necessary actions upon the detection of mobility status changes.

Figure 5:
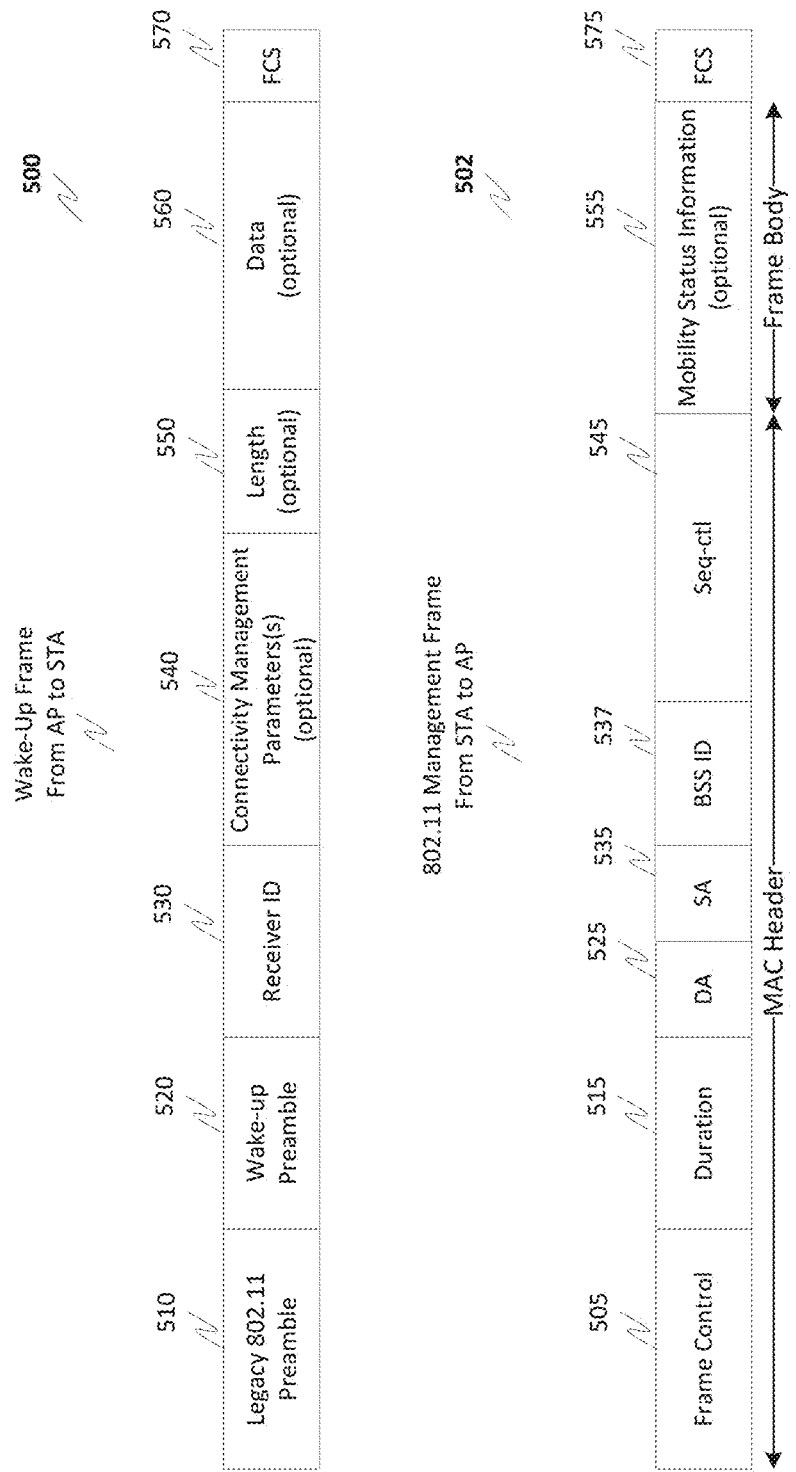
FIG. 5 illustrates an exemplary packet/frame structures.

Illustrated in FIG. 5 is an exemplary wake-up frame 500 and an exemplary management frame 502. The wake-up frame/packet 500 format could be used to communicate one or more connectivity management parameters, such as values for M and values for interval information. One or more of these parameters are usable by the AP to calculate/update the mobility status based on information provided by the STA (e.g., mobility state, speed, direction, etc.). As will be appreciated however, this information could also be included in other frame/packet formats.

The exemplary management frame/packet 502 format can include the mobility status information which, of course is optional, along with many of the other fields.

More specifically, and in general, the wake-up packet/frame 500 can include one or more of: a legacy IEEE 802.11 preamble field 510; an optional wake-up preamble field 520, which can contain a wake-up packet preamble; an optional receiver ID field 530, an optional connectivity management parameter(s) field 540, an optional length field 550 which can indicate the length of the wake-up frame; an optional data field 560 and an optional FCS field 570 which can indicate a Frame Check Sequence.

The exemplary management frame/packet 502 allows for the "Mobility Status Information" to be transmitted from a (LP-WUR-equipped) STA to the AP to indicate the STA's mobility status change(s). This information can be conveyed inside, for example, an 802.11 management frame in, for example, field 555 as shown.

The mobility status information can be sent from the STA to the AP, e.g., using, for example, a legacy 802.11 management frame, although other frame/packet formats and/or management frame/packet formats could also be used.

The exemplary IEEE 802.11 management frame 502 optionally includes a frame control field 505, a duration field 515, a destination MAC address 525, a source MAC address 535, a BSS ID 537 (Basic Service Set Identification), a sequence control 545, mobility status information 555 and a FCS field 575.

The exemplary management frame, which can be an action frame, could also be in the following format. For example, the format of the (mobility) management frame (or LP-WUR Mobility Management frame) can also be defined as follows:

TABLE 1

LP-WUR Mobility Management Frame Action Field Format

| Order | Information |
|---|---|
| 1 | Category |
| 2 | HE Action |
| 3 | Mobility Status Information |

The Category field can be set to a value for HE (High Efficiency).

The HE Action field can be set to the value for LP-WUR Power Saving.

The Mobility Status Information field can contain the mobility status information.

Figure 7:
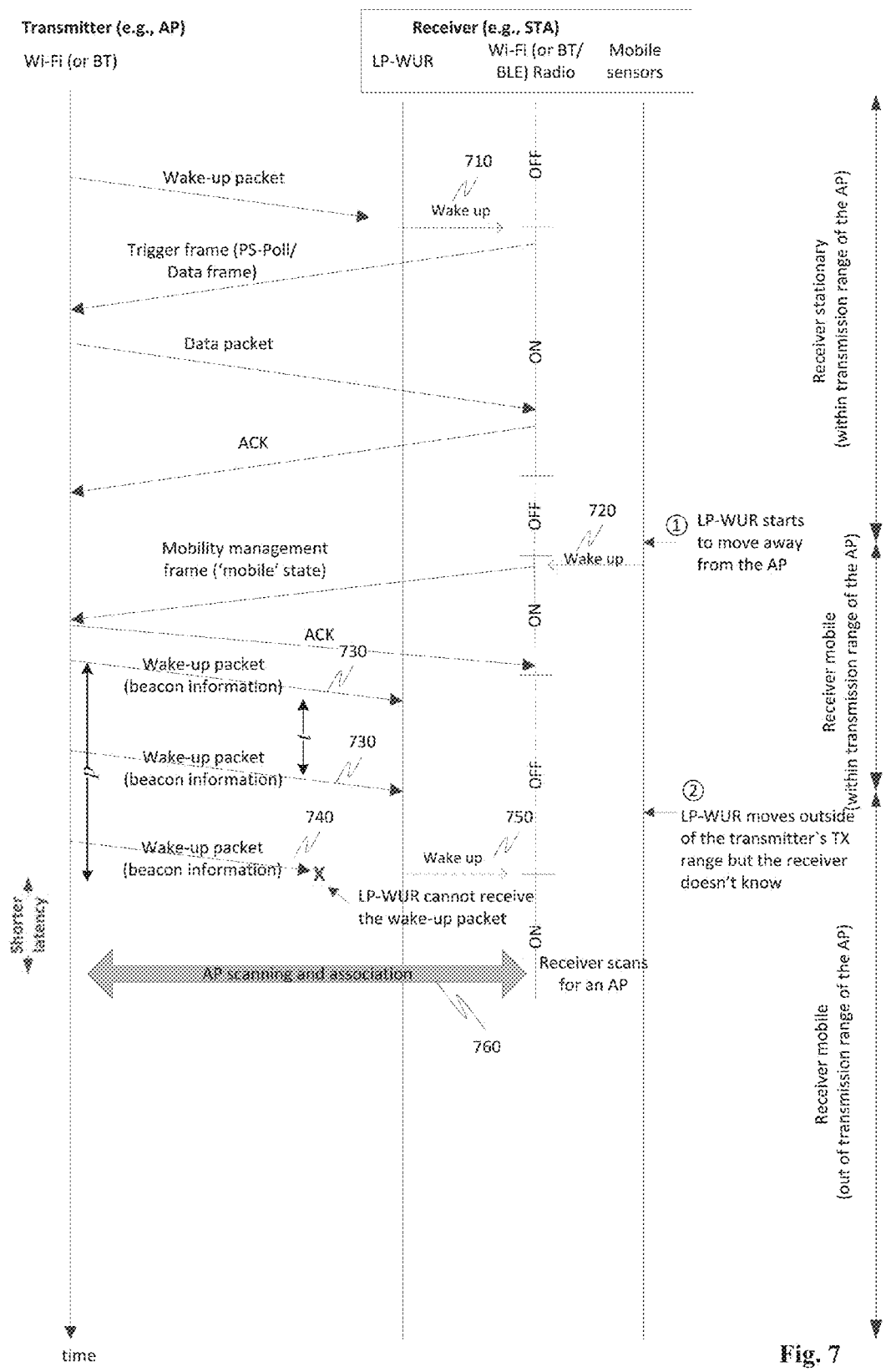
FIG. 7 is a is a fence-post diagram illustrating an exemplary advantage of the disclosed technology.

FIG. 7 outlines an exemplary illustration of one proposed connectivity management mechanism as discussed herein. Here, the main radio, e.g., Wi-Fi, exploits mobile sensor information to detect movement of a device and requests, for example, an AP to send periodic management frames, i.e., a wake-up signal with IEEE 802.11 beacon information embedded therein, to monitor connectivity to the AP.

In accordance with one optional aspect, the IEEE 802.11 beacon information can be partial beacon information which can be transmitted at a lower data rate than the full IEEE 802.11 beacon information.

The process begins with the transmitter, such as an access point, sending a wake-up packet to the receiver, such as a station. The LP-WUR in the receiver receives the wake-up packet from the transmitter and signals a wake-up message 710 to the Wi-Fi/BT/BLE radio. At this point, the Wi-Fi radio (i.e., the main radio) is in an off state. Upon waking up as a result of the wake-up packet, the Wi-Fi radio returns a trigger frame to the transmitter, which in turn returns a data packet to the Wi-Fi or main radio.

Upon receipt of the data packet by the main radio, an acknowledgment (ACK) is returned to the transmitter. During this time, the receiver is stationary, and within the transmission range of the AP. Upon completion of the transmission of the ACK, the receiver main radio goes into an off state, and, at point 1, the LP-WUR equipped device starts to move away from the AP. This triggers a wake-up message 720 to be sent from one or more of the devices monitoring the sensors to the main radio, which in turn forwards a mobility management frame indicating that the mobile device is in a mobile state to the AP. As discussed, this mobility management frame can include any type of information regarding the mobility status of the device including speed, direction, velocity, number of wake-up packets to be consecutively sent (e.g., M), a time interval, etc.

The AP, upon receipt of this mobility management frame, can return an ACK to the main radio. Next, the main radio enters an off state, with the transmitter sending wake-up packets 730 (beacon information) at intervals to the LP-WUR as illustrated in FIG. 7. At point 2, the LP-WUR moves outside of the transmitter's transmission range, however, the receiver main radio is unaware of this. Thus, when the next consecutive wake-up packet 740 is sent by the transmitter, the LP-WUR cannot receive the wake-up packet and in return, the LP-WUR forwards a wake-up signal 750 to the main radio, which switches to an on state, with the receiver commencing scanning for an AP. As illustrated in the figure, the amount of latency between last wake-up packet that was received by the LP-WUR and the AP scanning and association process 760 has been greatly reduced.

In this example, the mobility management frame requested the transmitter to send 3 wake-up packets either separated by a time t, or 3 wake-up packets within a period p. Here, the third wake-up packet was not received by the receiver which triggers the wake-up signal 750. As discussed however, the mobility management frame could alternatively, or in addition, specify mobility information (e.g., speed/direction of device) with the AP determining and confirming, for example in the ACK or another message, what types/number and/or timeframe wake-up packet(s) will be sent at. This information can then be used by the receiver to determine when wake-up packets are no longer being received and thus, for example, initiate AP scanning and association as illustrated in FIG. 7.

Figure 8:
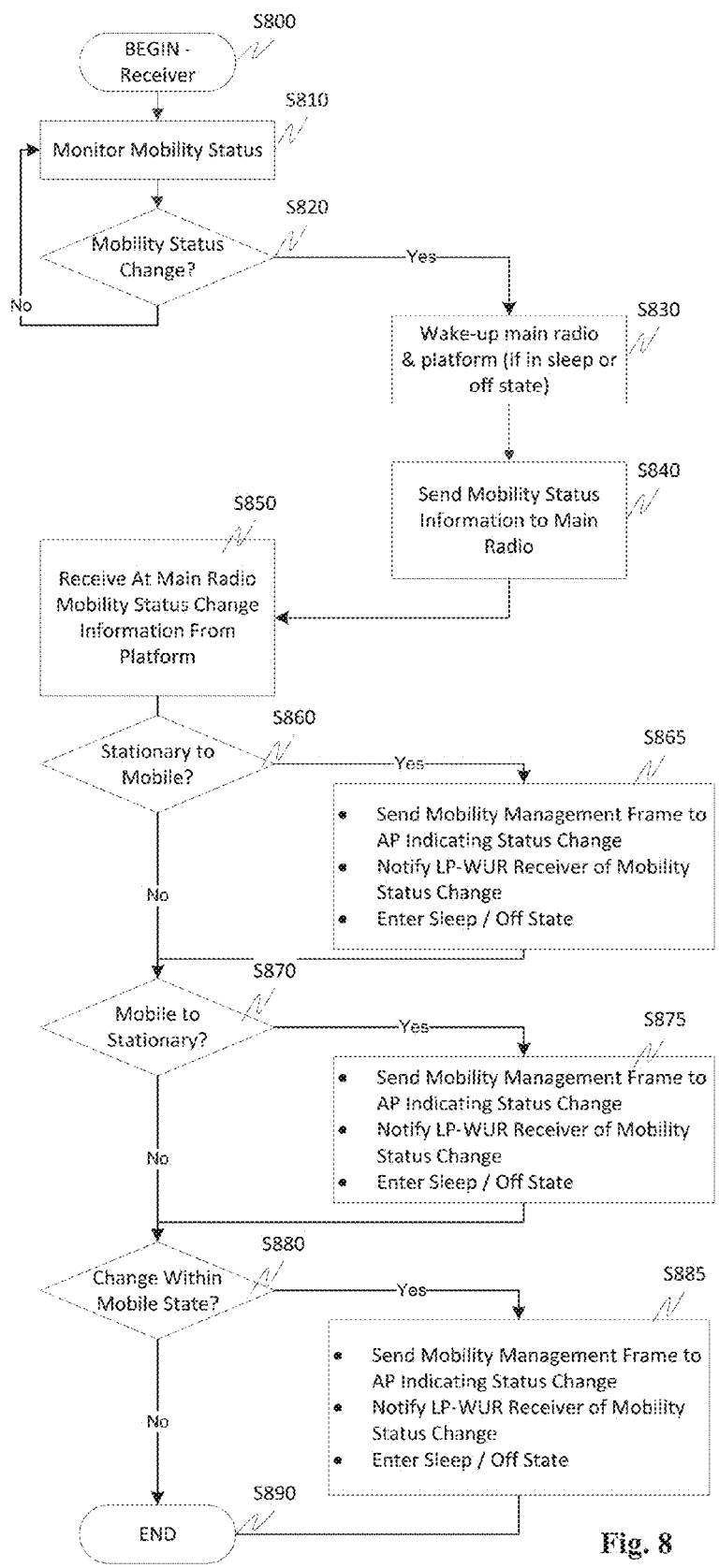
FIG. 8 is a flowchart illustrating an exemplary method of receiver operation.

FIG. 8 illustrates an exemplary method of operation of a receiver. In particular, control begins in step S800 and continues to step S810. In step S810, the mobility status of the receiver is monitored with, for example, input from one or more sensors as discussed herein. Based on this analysis, a determination is made in step S820 as to whether there should be a change in the mobility status of the device. If no change is to be made, control jumps back to step S810 with control otherwise continuing to step S830. In step S830, the main radio is woken up as well as one or more components of the platform, if it is in a sleep or an off state. Next, in step S840, mobility status information can optionally be sent to the main radio. Control then continues to step S850.

In step S850, the mobility status change information is received at the main radio, from, for example, one of the platform components and/or a power manager. Next, in step S860, a determination is made as to whether the mobility status change information indicates the device has gone from stationary state to a mobile state. If the device has gone from a stationary state to a mobile state, control continues to step S865 with control otherwise jumping to step S870.

In step S865, the receiver sends a mobility management frame to the AP indicating the status change from a stationary state to a mobile state, the receiver notifies the LP-WUR receiver of the mobility status change, and the receiver enters the sleep or off state. Control then continues to step S870.

In step S870, a determination is made as to whether the mobility status change information indicates the device has gone from a mobile state to a stationary state. If the device has gone from a mobile state to a stationary state, control continues to step S875, with control otherwise jumping to step S880.

In step S875, the receiver sends a mobility management frame to the AP indicating a status change from the mobile state to the stationary state. The receiver also notifies the LP-WUR receiver of the mobility status change and enters the sleep or off state. Control then continues to step S880.

In step S880, a determination is made as to whether the mobility status change information indicates the device's mobility status has changed within the mobile state, e.g., change of direction, speed, velocity, or the like.

If a change within the mobile state has been detected, control continues to step S885 with control otherwise continuing to step S890 where the control sequence ends.

In step S885, the receiver sends mobility management frame/information to the AP indicating the status change within the mobile state. Next, the receiver notifies the LP-WUR of the mobility status change and then enters the sleep or off state. Control then continues to step S890 where the control sequence ends.

As discussed, the mobility management frame can include any one or more of the types of information disclosed herein such as monitoring parameters, M, pre-defined time interval, and/or any type of information usable to effect wake-up of the radio and/or to reduce the time for AP scanning and association to commence.

Figure 9:
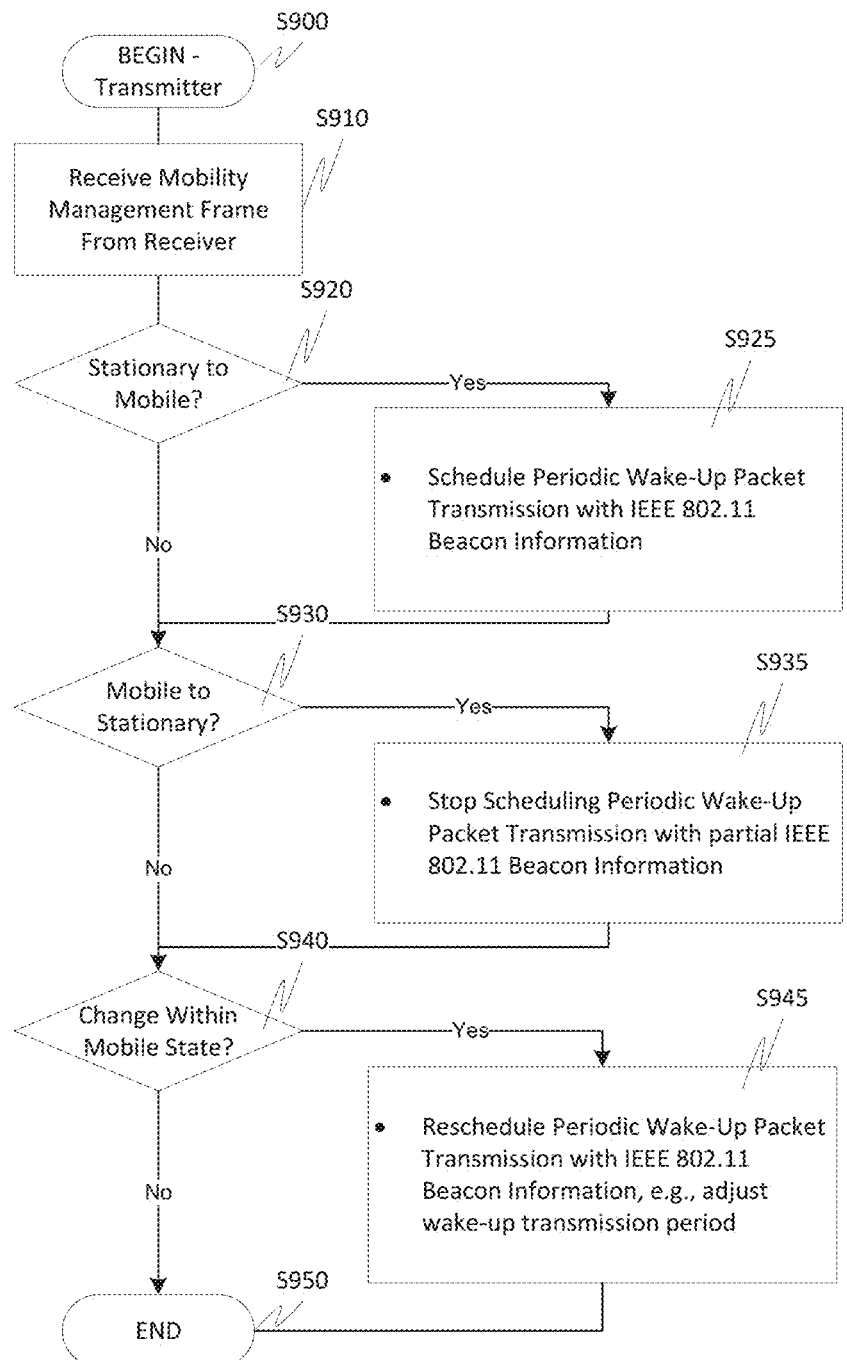
FIG. 9 is a flowchart illustrating an exemplary method of transmitter operation.

FIG. 9 outlines an exemplary method of operation for the transmitter. In particular, control begins in step S900 and continues to step S910. In step S910, the mobility management frame/information is received from the receiver. Next, the transmitter determines whether the information in the mobility management frame indicates that the receiver has gone from a stationary to a mobile state. If the receiver has gone from a stationary state to a mobile state, control continues to step S925 with control otherwise continuing to step S930.

In step S925, the transmitter schedules a periodic wake-up packet transmission utilizing IEEE 802.11 beacon information or partial IEEE 802.11 beacon information based on the information in the mobility management frame. Control then continues to step S930.

In step S930, a determination is made whether the device has transitioned from a mobile state to a stationary state. If the device has transitioned from a mobile state to a stationary state, control continues to step S935 with control otherwise continuing to step S940.

In step S935, the transmitter stops scheduling periodic wake-up transmissions using either the IEEE 802.11 or partial IEEE 802.11 beacon information. Control then continues to step S940.

In step S940, a determination is made whether the device has transitioned from a first mobile state to another or second mobile state. If the device has transitioned from a first mobile state to another mobile state, control continues to step S945 with control otherwise jumping to step S950.

In step S945, the transmitter re-schedules a periodic wake-up packet transmission using IEEE 802.11 beacon or partial IEEE 802.11 beacon information, where, for example, the wake-up transmission period/frequency can be adjusted. Control then continues to step S950, where the control sequence ends.

Figure 10:
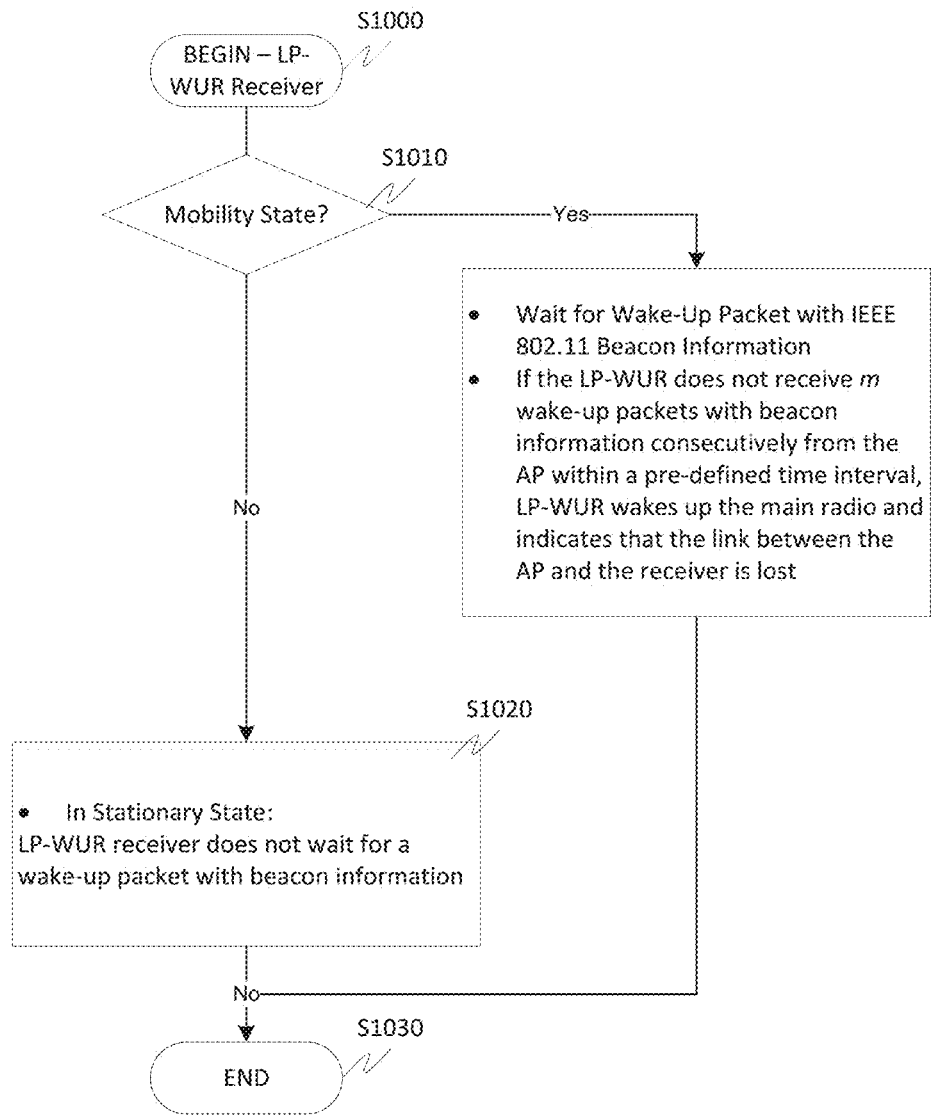
FIG. 10 is a flowchart illustrating an exemplary method of LP-WUR receiver operation.

FIG. 10 outlines an exemplary operation of the LP-WUR receiver. In particular, control begins in step S1000 and continues to step S1010. In step S1010, a determination is made as to whether the LP-WUR receiver is in a mobility state. If the LP-WUR receiver is in a mobility state, control continues to step S1015 with control otherwise jumping to step S1020.

In step S1015, the LP-WUR receiver waits for a wake-up packet with the IEEE 802.11 beacon information or partial beacon information. If the LP-WUR does not receive M wake-up packets with beacon information consecutively from the AP within a pre-defined time interval, the LP-WUR can wake-up the main radio and indicate that the link between the AP and the receiver has been lost. Control then continues to step S1030 where AP scanning and association can begin.

In step S1020, and if the LP-WUR receiver is in a stationary state, the LP-WUR receiver does not wait for a wake-up packet with beacon information with control continuing to step S1030 where the control sequence ends.

It should be appreciated, the various power management schemes discussed herein can have their specific features interchanged with one or more of the other power management schemes to provide, for example, further power savings, to alter/improve latency and/or alter platform functionality. While the techniques discussed herein have been specifically discussed in relation to IEEE 802.11 systems, it should be appreciated that the techniques discussed herein can generally be applicable to any type of wireless communication standard, protocol, and/or equipment. Moreover, all the flowcharts have been discussed in relation to a set of exemplary steps, it should be appreciated that some of these steps could be optional and excluded from the operational flow without affecting the success of the technique. Additionally, steps provided in the various flowcharts illustrated herein can be used in other flowcharts illustrated herein.

It is to also be understood that when it is discussed that the whole Wi-Fi/BT/BLE radio is to be turned on/off, it can be one or more of the Wi-Fi, Bluetooth®, and Bluetooth® Low Energy radio(s) that are turned on/off and if the device has all three radios, they need not all be turned on/off but optionally only the radio(s) that is needed.

In the detailed description, numerous specific details are set forth in order to provide a thorough understanding of the disclosed techniques. However, it will be understood by those skilled in the art that the present techniques may be practiced without these specific details. In other instances, well-known methods, procedures, components and circuits have not been described in detail so as not to obscure the present disclosure.

Although embodiments are not limited in this regard, discussions utilizing terms such as, for example, "processing," "computing," "calculating," "determining," "establishing", "analysing", "checking", or the like, may refer to operation(s) and/or process(es) of a computer, a computing platform, a computing system, a communication system or subsystem, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments are not limited in this regard, the terms "plurality" and "a plurality" as used herein may include, for example, "multiple" or "two or more". The terms "plurality" or "a plurality" may be used throughout the specification to describe two or more components, devices, elements, units, parameters, circuits, or the like. For example, "a plurality of stations" may include two or more stations.

It may be advantageous to set forth definitions of certain words and phrases used throughout this document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, interconnected with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, circuitry, firmware or software, or some combination of at least two of the same. It should be noted that the functionality associated with any particular controller may be centralized or distributed, whether locally or remotely. Definitions for certain words and phrases are provided throughout this document and those of ordinary skill in the art should understand that in many, if not most instances, such definitions apply to prior, as well as future uses of such defined words and phrases.

The exemplary embodiments will be described in relation to communications systems, as well as protocols, techniques, means and methods for performing communications, such as in a wireless network, or in general in any communications network operating using any communications protocol(s). Examples of such are home or access networks, wireless home networks, wireless corporate networks, and the like. It should be appreciated however that in general, the systems, methods and techniques disclosed herein will work equally well for other types of communications environments, networks and/or protocols.

For purposes of explanation, numerous details are set forth in order to provide a thorough understanding of the present techniques. It should be appreciated however that the present disclosure may be practiced in a variety of ways beyond the specific details set forth herein. Furthermore, while the exemplary embodiments illustrated herein show various components of the system collocated, it is to be appreciated that the various components of the system can be located at distant portions of a distributed network, such as a communications network, node, within a Domain Master, and/or the Internet, or within a dedicated secured, unsecured, and/or encrypted system and/or within a network operation or management device that is located inside or outside the network. As an example, a Domain Master can also be used to refer to any device, system or module that manages and/or configures or communicates with any one or more aspects of the network or communications environment and/or transceiver(s) and/or stations and/or access point(s) described herein.

Thus, it should be appreciated that the components of the system can be combined into one or more devices, or split between devices, such as a transceiver, an access point, a station, a Domain Master, a network operation or management device, a node or collocated on a particular node of a distributed network, such as a communications network. As will be appreciated from the following description, and for reasons of computational efficiency, the components of the system can be arranged at any location within a distributed network without affecting the operation thereof. For example, the various components can be located in a Domain Master, a node, a domain management device, such as a MIB, a network operation or management device, a transceiver(s), a station, an access point(s), or some combination thereof. Similarly, one or more of the functional portions of the system could be distributed between a transceiver and an associated computing device/system.

Furthermore, it should be appreciated that the various links 5, including the communications channel(s) connecting the elements, can be wired or wireless links or any combination thereof, or any other known or later developed element(s) capable of supplying and/or communicating data to and from the connected elements. The term module as used herein can refer to any known or later developed hardware, circuitry, software, firmware, or combination thereof, that is capable of performing the functionality associated with that element. The terms determine, calculate, and compute and variations thereof, as used herein are used interchangeable and include any type of methodology, process, technique, mathematical operational or protocol.

Moreover, while some of the exemplary embodiments described herein are directed toward a transmitter portion of a transceiver performing certain functions, or a receiver portion of a transceiver performing certain functions, this disclosure is intended to include corresponding and complementary transmitter-side or receiver-side functionality, respectively, in both the same transceiver and/or another transceiver(s), and vice versa.

The exemplary embodiments are described in relation to power control in a wireless transceiver. However, it should be appreciated, that in general, the systems and methods herein will work equally well for any type of communication system in any environment utilizing any one or more protocols including wired communications, wireless communications, powerline communications, coaxial cable communications, fiber optic communications, and the like.

The exemplary systems and methods are described in relation to IEEE 802.11 and/or Bluetooth® and/or Bluetooth® Low Energy transceivers and associated communication hardware, software and communication channels. However, to avoid unnecessarily obscuring the present disclosure, the following description omits well-known structures and devices that may be shown in block diagram form or otherwise summarized.

Exemplary aspects are directed toward:

A wireless communications device comprising:

a low-power wake-up radio; and a mobility manager configured to receive information from one or more sensors and determine a mobility management frame, the mobility management frame specifying transmitter operation which is usable by the low-power wake-up radio to enable a main radio in the wireless communications device.

Any one or more of the above aspects, further comprising one or more of a transmitter, a receiver, an interleaver/deinterleaver, an analog front end, a modulator/demodulator, a GPU, an accelerator, an encoder/decoder, one or more antennas, a processor and memory.

Any one or more of the above aspects, wherein the one or more sensors are one or more of a GPS, accelerometer, gyroscope and a Wi-Fi location determination module.

Any one or more of the above aspects, further comprising a latency requirement estimator configured to evaluate the information from the one or more sensors.

Any one or more of the above aspects, wherein the mobility management frame includes one or more of a frame control information field, a mobility status information field and a FCS field.

Any one or more of the above aspects, wherein the mobility status information field specifies the transmitter operation of one or more of a number of wake-up packets to be transmitted by the transmitter and a time interval.

Any one or more of the above aspects, further comprising a wake-up controller configured to control operation of the main radio.

Any one or more of the above aspects, further comprising a mobility estimator configured to evaluate the information from the one or more sensors and determine mobility of the device.

Any one or more of the above aspects, further comprising a low-power wake-up radio power manager configured to control operation of the low-power wake-up radio based on the information in the mobility management frame.

Any one or more of the above aspects, configured to one or more of save power and improve latency at least based on the mobility management frame.

A wireless communications method comprising:

receiving information from one or more sensors associated with a wireless communications device; and determining a mobility management frame, the mobility management frame specifying transmitter operation which is usable by a low-power wake-up radio to enable a main radio in the wireless communications device.

Any one or more of the above aspects, wherein the wireless communications device further comprises one or more of a transmitter, a receiver, an interleaver/deinterleaver, an analog front end, a modulator/demodulator, a GPU, an accelerator, an encoder/decoder, one or more antennas, a processor and memory.

Any one or more of the above aspects, wherein the one or more sensors are one or more of a GPS, accelerometer, gyroscope and a Wi-Fi location determination module.

Any one or more of the above aspects, further comprising evaluating the information from the one or more sensors.

Any one or more of the above aspects, wherein the mobility management frame includes one or more of a frame control information field, a mobility status information field and a FCS field.

Any one or more of the above aspects, wherein the mobility status information field specifies the transmitter operation of one or more of a number of wake-up packets to be transmitted by the transmitter and a time interval.

Any one or more of the above aspects, further comprising controlling operation of the main radio.

Any one or more of the above aspects, further comprising evaluating the information from the one or more sensors and determining a mobility status of the wireless communications device.

Any one or more of the above aspects, further comprising controlling operation of the low-power wake-up radio based on the information in the mobility management frame.

Any one or more of the above aspects, further comprising one or more of saving power and improving latency at least based on the mobility management frame.

A wireless communications device comprising:

means for receiving information from one or more sensors associated with a wireless communications device; and means for determining a mobility management frame, the mobility management frame specifying transmitter operation which is usable by a low-power wake-up radio to enable a main radio in the wireless communications device.

Any one or more of the above aspects, wherein the wireless communications device further comprises one or more of a transmitter, a receiver, an interleaver/deinterleaver, an analog front end, a modulator/demodulator, a GPU, an accelerator, an encoder/decoder, one or more antennas, a processor and memory.

Any one or more of the above aspects, wherein the one or more sensors are one or more of a GPS, accelerometer, gyroscope and a Wi-Fi location determination module.

Any one or more of the above aspects, further comprising evaluating the information from the one or more sensors.

Any one or more of the above aspects, wherein the mobility management frame includes one or more of a frame control information field, a mobility status information field and a FCS field.

Any one or more of the above aspects, wherein the mobility status information field specifies the transmitter operation of one or more of a number of wake-up packets to be transmitted by the transmitter and a time interval.

Any one or more of the above aspects, further comprising controlling operation of the main radio.

Any one or more of the above aspects, further comprising evaluating the information from the one or more sensors and determining a mobility status of the wireless communications device.

Any one or more of the above aspects, further comprising controlling operation of the low-power wake-up radio based on the information in the mobility management frame.

Any one or more of the above aspects, further comprising one or more of saving power and improving latency at least based on the mobility management frame.

A non-transitory computer-readable information storage media, having stored thereon instructions, that when executed by a processor, perform a method comprising:

receiving information from one or more sensors associated with a wireless communications device; and determining a mobility management frame, the mobility management frame specifying transmitter operation which is usable by a low-power wake-up radio to enable a main radio in the wireless communications device.

Any one or more of the above aspects, wherein the wireless communications device further comprises one or more of a transmitter, a receiver, an interleaver/deinterleaver, an analog front end, a modulator/demodulator, a GPU, an accelerator, an encoder/decoder, one or more antennas, a processor and memory.

Any one or more of the above aspects, wherein the one or more sensors are one or more of a GPS, accelerometer, gyroscope and a Wi-Fi location determination module.

Any one or more of the above aspects, further comprising evaluating the information from the one or more sensors.

Any one or more of the above aspects, wherein the mobility management frame includes one or more of a frame control information field, a mobility status information field and a FCS field.

Any one or more of the above aspects, wherein the mobility status information field specifies the transmitter operation of one or more of a number of wake-up packets to be transmitted by the transmitter and a time interval.

Any one or more of the above aspects, further comprising controlling operation of the main radio.

Any one or more of the above aspects, further comprising evaluating the information from the one or more sensors and determining a mobility status of the wireless communications device.

Any one or more of the above aspects, further comprising controlling operation of the low-power wake-up radio based on the information in the mobility management frame.

Any one or more of the above aspects, further comprising one or more of saving power and improving latency at least based on the mobility management frame.

Any one or more of the aspects as substantially described herein.

For purposes of explanation, numerous details are set forth in order to provide a thorough understanding of the present embodiments. It should be appreciated however that the techniques herein may be practiced in a variety of ways beyond the specific details set forth herein.

Furthermore, while the exemplary embodiments illustrated herein show the various components of the system collocated, it is to be appreciated that the various components of the system can be located at distant portions of a distributed network, such as a communications network and/or the Internet, or within a dedicated secure, unsecured and/or encrypted system. Thus, it should be appreciated that the components of the system can be combined into one or more devices, such as an access point or station, or collocated on a particular node/element(s) of a distributed network, such as a telecommunications network. As will be appreciated from the following description, and for reasons of computational efficiency, the components of the system can be arranged at any location within a distributed network without affecting the operation of the system. For example, the various components can be located in a transceiver, an access point, a station, a management device, or some combination thereof. Similarly, one or more functional portions of the system could be distributed between a transceiver, such as an access point(s) or station(s) and an associated computing device.

Furthermore, it should be appreciated that the various links, including communications channel(s), connecting the elements (which may not be not shown) can be wired or wireless links, or any combination thereof, or any other known or later developed element(s) that is capable of supplying and/or communicating data and/or signals to and from the connected elements. The term module as used herein can refer to any known or later developed hardware, software, firmware, or combination thereof that is capable of performing the functionality associated with that element. The terms determine, calculate and compute, and variations thereof, as used herein are used interchangeably and include any type of methodology, process, mathematical operation or technique.

While the above-described flowcharts have been discussed in relation to a particular sequence of events, it should be appreciated that changes to this sequence can occur without materially effecting the operation of the embodiment(s). Additionally, the exact sequence of events need not occur as set forth in the exemplary embodiments, but rather the steps can be performed by one or the other transceiver in the communication system provided both transceivers are aware of the technique being used for initialization. Additionally, the exemplary techniques illustrated herein are not limited to the specifically illustrated embodiments but can also be utilized with the other exemplary embodiments and each described feature is individually and separately claimable.

The above-described system can be implemented on a wireless telecommunications device(s)/system, such an IEEE 802.11 transceiver, or the like. Examples of wireless protocols that can be used with this technology include IEEE 802.11a, IEEE 802.11b, IEEE 802.11g, IEEE 802.11n, IEEE 802.11ac, IEEE 802.11ad, IEEE 802.11af, IEEE 802.11ah, IEEE 802.11ai, IEEE 802.11aj, IEEE 802.11aq, IEEE 802.11ax, WiFi, LTE, 4G, Bluetooth®, WirelessHD, WiGig, WiGi, 3GPP, Wireless LAN, WiMAX, and the like.

The term transceiver as used herein can refer to any device that comprises hardware, software, circuitry, firmware, or any combination thereof and is capable of performing any of the methods, techniques and/or algorithms described herein.

Additionally, the systems, methods and protocols can be implemented to improve one or more of a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a modem, a transmitter/receiver, any comparable means, or the like. In general, any device capable of implementing a state machine that is in turn capable of implementing the methodology illustrated herein can benefit from the various communication methods, protocols and techniques according to the disclosure provided herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, Broadcom® AirForce BCM4704/BCM4703 wireless networking processors, the AR7100 Wireless Network Processing Unit, other industry-equivalent processors, and may perform computational functions using any known or future-developed standard, instruction set, libraries, and/or architecture.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with the embodiments is dependent on the speed and/or efficiency requirements of the system, the particular function, and the particular software or hardware systems or microprocessor or microcomputer systems being utilized. The communication systems, methods and protocols illustrated herein can be readily implemented in hardware and/or software using any known or later developed systems or structures, devices and/or software by those of ordinary skill in the applicable art from the functional description provided herein and with a general basic knowledge of the computer and telecommunications arts.

Moreover, the disclosed methods may be readily implemented in software and/or firmware that can be stored on a storage medium to improve the performance of: a programmed general-purpose computer with the cooperation of a controller and memory, a special purpose computer, a microprocessor, or the like. In these instances, the systems and methods can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications transceiver.

It is therefore apparent that there has at least been provided systems and methods for power management in a wireless device. While the embodiments have been described in conjunction with a number of embodiments, it is evident that many alternatives, modifications and variations would be or are apparent to those of ordinary skill in the applicable arts. Accordingly, this disclosure is intended to embrace all such alternatives, modifications, equivalents and variations that are within the spirit and scope of this disclosure.

The invention claimed is:

1. A wireless communications device comprising:
   a low-power wake-up radio; and
   a mobility manager configured to receive information from one or more sensors regarding movement of the wireless communications device and determine a mobility management frame at least based on the movement of the wireless communications device, the mobility management frame specifying transmitter operation which is usable by the low-power wake-up radio to enable a main radio in the wireless communications device.

2. The device of claim 1, further comprising one or more of a transmitter, a receiver, an interleaver/deinterleaver, an analog front end, a modulator/demodulator, a GPU, an accelerator, an encoder/decoder, one or more antennas, a processor and memory.

3. The device of claim 1, wherein the one or more sensors are one or more of a GPS, accelerometer, gyroscope and a Wi-Fi location determination module.

4. The device of claim 1, further comprising a latency requirement estimator configured to evaluate the information from the one or more sensors.

5. The device of claim 1, wherein the mobility management frame includes one or more of a frame control information field, a mobility status information field and a FCS field.

6. The device of claim 5, wherein the mobility status information field specifies the transmitter operation of one or more of a number of wake-up packets to be transmitted by the transmitter and a time interval.

7. The device of claim 1, further comprising a wake-up controller configured to control operation of the main radio.

8. The device of claim 1, further comprising a mobility estimator configured to evaluate the information from the one or more sensors and determine mobility of the device, the information including one or more of moving speed, accelerometer information and direction information for the wireless communications device.

9. The device of claim 1, further comprising a low-power wake-up radio power manager configured to control operation of the low-power wake-up radio based on the information in the mobility management frame.

10. The device of claim 1, configured to one or more of save power and improve latency at least based on the mobility management frame.

11. A non-transitory computer-readable information storage media, having stored thereon instructions, that when executed by a processor perform a wireless communication method comprising:
   receiving information from one or more sensors associated with a wireless communications device regarding movement of the wireless communications device; and
   determining a mobility management frame at least based on the movement of the wireless communications device, the mobility management frame specifying transmitter operation which is usable by a low-power wake-up radio to enable a main radio in the wireless communications device.

12. The media of claim 11, wherein the wireless communications device further comprises one or more of a transmitter, a receiver, an interleaver/deinterleaver, an analog front end, a modulator/demodulator, a GPU, an accelerator, an encoder/decoder, one or more antennas, a processor and memory.

13. The media of claim 11, wherein the one or more sensors are one or more of a GPS, accelerometer, gyroscope and a Wi-Fi location determination module.

14. The media of claim 11, further comprising evaluating the information from the one or more sensors.

15. The media of claim 11, wherein the mobility management frame includes one or more of a frame control information field, a mobility status information field and a FCS field.

16. The media of claim 15, wherein the mobility status information field specifies the transmitter operation of one or more of a number of wake-up packets to be transmitted by the transmitter and a time interval.

17. The media of claim 11, further comprising controlling operation of the main radio.

18. The media of claim 11, further comprising evaluating the information from the one or more sensors and determining a mobility status of the wireless communications device, the information including one or more of moving speed, accelerometer information and direction information for the wireless communications device.

19. The media of claim 11, further comprising controlling operation of the low-power wake-up radio based on the information in the mobility management frame.

20. The media of claim 11, further comprising one or more of saving power and improving latency at least based on the mobility management frame.

21. A wireless communications device comprising:

means for receiving information from one or more sensors associated with a wireless communications device regarding movement of the wireless communications device; and means for determining a mobility management frame at least based on the movement of the wireless communications device, the mobility management frame specifying transmitter operation which is usable by a low-power wake-up radio to enable a main radio in the wireless communications device.

22. A wireless communications method comprising:

receiving information from one or more sensors associated with a wireless communications device regarding movement of the wireless communications device; and determining a mobility management frame at least based on the movement of the wireless communications device, the mobility management frame specifying transmitter operation which is usable by a low-power wake-up radio to enable a main radio in the wireless communications device.

* * * * *